United States Patent
Yang

(10) Patent No.: US 6,920,333 B2
(45) Date of Patent: Jul. 19, 2005

(54) DECISION FEEDBACK EQUALIZER WITH EMBEDDED COHERENT SIGNAL COMBINER

(75) Inventor: George L. Yang, 15 Longfellow Ct., Freehold, NJ (US) 07728

(73) Assignee: George L. Yang, Owings Mills, MD (US)

(*) Notice: Subject to any disclaimer, the term of this patent is extended or adjusted under 35 U.S.C. 154(b) by 485 days.

(21) Appl. No.: 10/242,243

(22) Filed: Sep. 12, 2002

(65) Prior Publication Data

US 2004/0053588 A1 Mar. 18, 2004

(51) Int. Cl.[7] .............................................. H04B 15/00
(52) U.S. Cl. ...................... 455/505; 455/504; 455/506; 455/307; 375/229; 375/236
(58) Field of Search ................................ 455/504–506; 375/229–236, 348

(56) References Cited

U.S. PATENT DOCUMENTS

| | | | |
|---|---|---|---|
| 5,243,624 A | * | 9/1993 | Paik et al. .................. 375/232 |
| 5,283,811 A | * | 2/1994 | Chennakeshu et al. ..... 375/234 |
| 5,311,546 A | * | 5/1994 | Paik et al. .................. 375/232 |
| 5,321,723 A | * | 6/1994 | Mizoguchi .................. 375/230 |
| 5,440,583 A | * | 8/1995 | Koike ......................... 375/233 |
| 5,646,958 A | * | 7/1997 | Tsujimoto ................... 375/233 |
| 5,661,753 A | * | 8/1997 | Iemura ........................ 375/230 |
| 5,668,833 A | * | 9/1997 | Kurokami et al. ........... 375/233 |
| 6,366,613 B2 | * | 4/2002 | Sommer et al. ............. 375/232 |
| 2001/0043650 A1 | * | 11/2001 | Sommer et al. ............. 375/232 |

* cited by examiner

*Primary Examiner*—Edward F. Urban
*Assistant Examiner*—Lana Le

(57) ABSTRACT

A receiver in a communication system, for combining various significant components of a multipath fading signal and eliminating all other small components, consists of a signal generator, a plurality of delay devices, a plurality of decision feedback equalizers with embedded coherent signal combiners, a controller, a coherent signal combiner, and a decision circuit. The first decision feedback equalizer receives its inputs signals from a delay device and a signal generator, and each of the rest decision feedback equalizer receives its input signals from a corresponding delay device and the signal generator of its previous decision feedback equalizer. The coherent signal combiner, coupled to the output of the summation circuit of the last decision feedback equalizer, combines all the significant component signals together. The decision circuit makes a decision on transmitted symbol from the output signal of the coherent signal combiner. The controller collects information from various devices and generates control signals for various devices. Each decision feedback equalizer with embedded coherent signal combiner comprises of a feedforward filter, a feedback filter, a summation circuit, a signal generator, and coefficient updating device. The signal generator in each decision feedback equalizer consists of a plurality of information extractors, a plurality of component signal generators, a coherent signal combiner, a decision circuit, and a summation circuit.

10 Claims, 4 Drawing Sheets

DECISION FEEDBACK EQUALIZER WITH EMBEDDED COHERENT SIGNAL COMBINER

FEDERALLY SPONSORED RESEARCH

Not Applicable

SEQUENCE LISTING OR PROGRAM

Not Applicable

FIELD OF THE INVENTION

The invention is generally related to a receiver of a communication system. More particularly the invention is related to applying decision feedback equalizer with embedded coherent signal combiner in a receiver for combating deep fading spanned over several symbol periods.

BACKGROUND OF THE INVENTION

In a wireless communication system, especially in a mobile communication system, fading occurs from times to times. Buildings, mountains, and foliage on the transmission path between a transmitter and a receiver can cause reflection, diffraction, and scattering on a propagating electromagnetic wave. The electromagnetic waves reflected from various large objects, travel along different paths of varying lengths. If there is an obstacle with sharp irregularities on the transmission path, the secondary waves resulting from the obstructing surface are present around the obstacle. Also if there are small objects, rough surfaces, and other irregularities on the transmission path, scattered waves are created. All these waves will interact with each other and result in multipath fading.

Usually there are two methods to deal with the multipath fading. One method is to use a multipath signal combiner such as a RAKE receiver to combine all the significant paths of a multipath-fading signal together. Another method is to use an equalizer to eliminate all the paths of a multipath-fading signal except the strongest path. Under some scenarios, however, neither signal combiner alone nor decision feedback equalizer alone works well.

There is a corresponding component signal for each path of a multipath-fading signal. A multipath signal combiner in a receiver is to combine all the significant component signals according to their corresponding signal strengths. It works effectively when the most significant component signals have almost same strength and these component signals do not nullify each other. On average, a multipath signal combiner can provide a signal more stable and stronger than each individual component signal. For a multipath radio link with multipath fading, a transmitted symbol appears several times at a receiver in the time domain with each one corresponding to a different path. When transmission rate is low, the multipath fading spans in less than one symbol period. Though the multipath component signals interfere with each other, the transmitted symbols do not cancel each other totally. But as the transmission rate is higher and higher, a multipath fading can span over one or more symbol periods and a symbol on one path could almost cancel a previous symbol on another path. When symbols almost cancel each other or possess nulls, a multipath combiner has nothing to combine and therefore system performance declines.

A decision-feedback equalizer in a receiver, on another hand, is effective to compensate the nulls mentioned above.

Basically, an equalizer in a receiver is to keep the strongest path and eliminate all other paths. It works effectively when there is a strong and stable path. Under some environments such as in many metropolitan areas, there is no line-of-sight signal. The received signal is a multipath-fading signal from reflection, scattering, and diffraction. Statistically no any particular component signal of the multipath-fading signal is stable for a relatively long period of time and significant stronger than the rest component signals in a fairly large region. Another problem with regular decision feedback equalizer is that the feedforward filter may not work efficiently when there is no strong line-of-sight signal. Since future symbols are under various intersymbol interference and noise, in order to make sure convergence, the coefficients of the feedforward filter for getting rid of the interference from future symbols to current symbol have to be relatively small.

Therefore when a multipath fading spans one or more symbol periods and no any path is stable and strong over a relatively large area for a relatively long period of time, either multipath combiner alone or equalizer alone does not work effectively. One example for this kind of scenario is a high-speed mobile receiver in metropolitan area. In order to have reliable communication under this kind of scenario, one may want to use both coherent signal combiner and decision feedback equalizer with a better estimation of the interference of future and past symbols to current symbol. Also a plurality of decision feedback equalizers with embedded coherent signal combiners can cascade one by one to further improve the system performance. With multistage structure, an equalizer at a later stage can provide a better estimation of the interference of future and past symbols to current symbol then one in an earlier stage.

OBJECTIVES OF THE INVENTION

The primary objective of the invention is to improve the performance of a decision feedback equalizer by coherently combining the significant component signals of a multipath fading signal, rebuilding these signals, adding these rebuilt signals together to produce a combined signal, and feeding the combined signal to the feedforward filter of the decision feedback equalizer.

Another objective of the invention is to improve the performance of a decision feedback equalizer by rebuilding the significant component signals of a multipath fading signal, combining all these rebuilt signals to produce a combined signal, and feeding the combined signal to the feedforward filter of the decision feedback equalizer.

Another objective of the invention is to improve the performance of a decision feedback equalizer by eliminating all the component signals but the significant component signals by taking the combination of the rebuilt significant component signals as the input signals of the feedforward filter and feedback filter.

Another objective of the invention is to improve the performance of a decision feedback equalizer by improving the estimation of interference of future and past samples to the sample under consideration.

Another objective of the invention is to provide a multi-stage of decision feedback equalizers with embedded coherent signal combiner and signal generators for further improving the performance.

Another objective of the invention is to provide a multi-stage of decision feedback equalizers with embedded coherent signal combiners for further improving the performance.

Another objective of the invention is to provide a multi-stage of decision feedback equalizers with embedded signal generators for further improving the performance.

BRIEF DESCRIPTION OF THE DRAWINGS

The accompanying drawings, which are incorporated in and constitute a part of the specification, depict the preferred embodiments of the present invention, and together with the description, serve to explain the principle of the invention. In the figures, like reference numerals refer to the same or similar elements.

DETAILED DESCRIPTION OF THE PREFERRED EMBODIMENTS

Detailed description of the preferred embodiments is provided herein. The embodiments illustrate dynamic matched filter bank, signal combiner, and their applications in a receiver of a communication system by way of examples, not by way of limitations. It is to be understood that it could be easy for those skilled in the art to modify the embodiments in many different ways without departing from the spirit and scope of the invention. For example, the feedback filter of a decision feedback equalizer and the feedforward filter of next decision feedback filter could share the same shift registers. Therefore, specific details disclosed are not to be interpreted as limitations, but rather as bases for the claims and as representative bases for teaching one to employ the present invention in virtually any appropriately detailed system, structure or manner.

Figure 1:
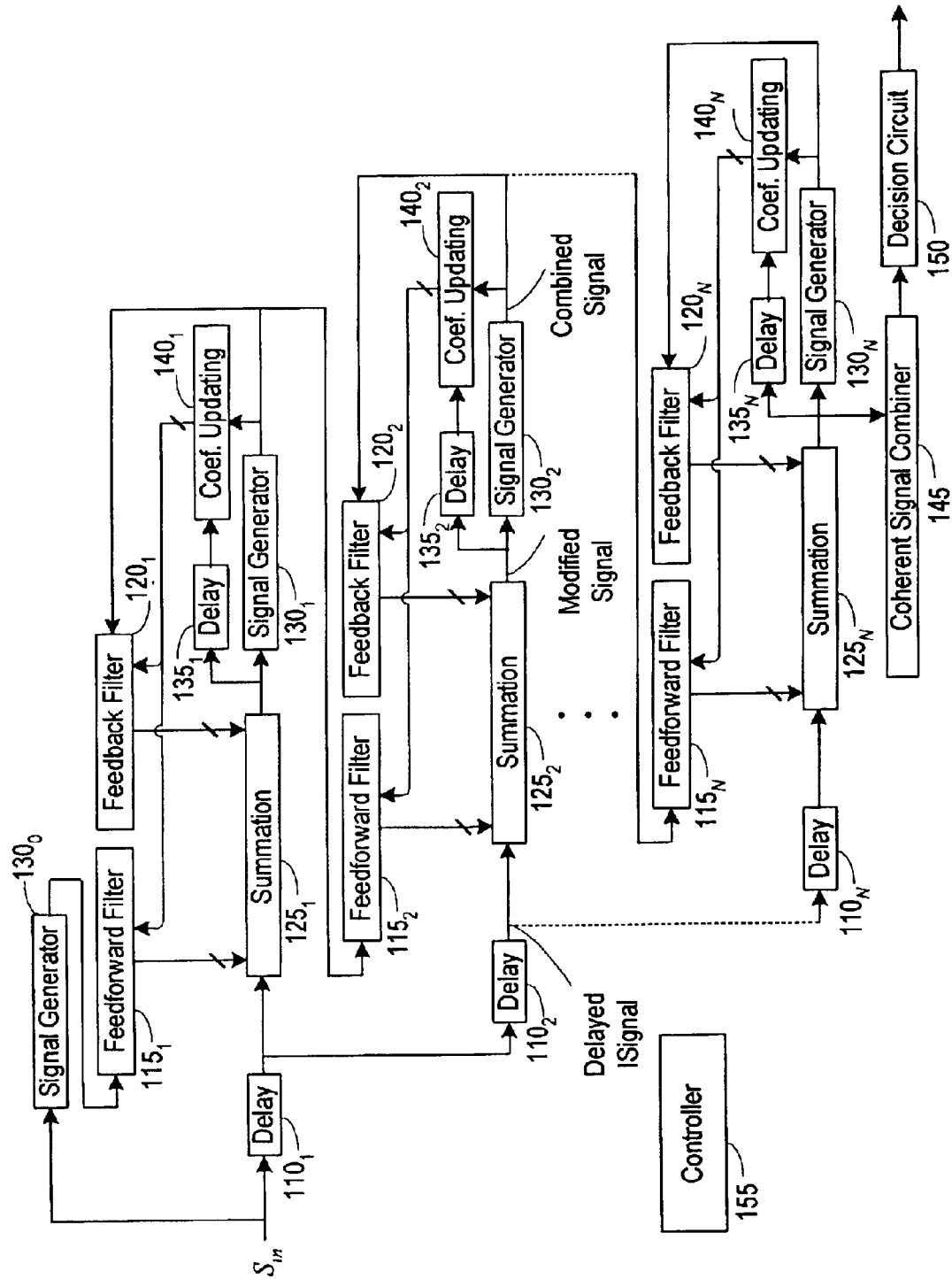
FIG. 1 illustrates the first embodiment of a decision feedback equalizer and a multistage structure of the decision feedback equalizers.

FIG. 1 shows the essential of a receiver with multistage of decision feedback equalizers.

The received signal $S_{in}$ is in the form of a series of samples. It is fed to a signal generator $130_0$ at sampling frequency. The signal generator $130_0$ is to find the information about each significant component signal of a multipath-fading signal, make tentative decisions on transmitted symbols, rebuild each significant component signal, and combine these rebuilt component signals together to produce a combined signal.

The first decision feedback equalizer consists of a feedforward filter $115_1$, a feedback filter $120_1$, a summation circuit $125_1$, a signal generator $130_1$, a delay device $135_1$, and a coefficient updating device $140_1$. The decision feedback equalizer works at sampling frequency.

The feedforward filter $115_1$ receives signal from the signal generator $130_0$. It is for estimating the precursor interference of future samples to the sample under consideration. The delay device $110_1$ delays the received signal $S_{in}$ for a certain amount of time so that its output signal can align up with the signals from the feedforward filter $115_1$. The delay device $110_1$ works at sampling frequency. The feedback filter $120_1$ is for estimating the post interference of past samples to the sample under consideration. The summation circuit $125_1$ combines the signals from the delay device $110_1$, the feedforward filter $115_1$, and the feedback filter $120_1$ together to remove the interference from both future and past samples to the sample under consideration. Another signal generator $130_1$, coupled to the output of the summation circuit $125_1$, is for producing another combined signal. The new combined signal is fed back to the feedback filter $120_1$ of the first decision feedback equalizer.

For the feedforward filter and the feedback filter have taken care of the precursor interference and the postcursor interference respectively, the remaining interference to symbol under consideration is relatively much smaller.

The delay device $135_1$ delays the signal from the summation circuit $125_1$ a certain amount of time so that its output signal can align up with the signal from the signal generator $130_1$. The coefficient updating device $140_1$, receiving signals from both the signal generator $130_1$ and the delay device $135_1$, generates adjusting signals to update the coefficients in the feedforward filter $115_1$ and the feedback filter $120_1$.

The second decision feedback equalizer consists of a feedforward filter $115_2$, a feedback filter $120_2$, a summation circuit $125_2$, a signal generator $130_2$, a delay device $135_2$, and a coefficient updating device $140_2$. The feedforward filter $115_2$ receives signal from the signal generator $130_1$ of the first decision feedback equalizer. The delay device $110_2$ receives signal from the delay device $110_1$. Each device of the second decision feedback equalizer works in the same way as a corresponding device of the first decision feedback equalizer.

Suppose there are N stages and correspondingly there are N decision feedback equalizers. Each device of one of the rest N-1 decision feedback equalizers works in the same way as a corresponding device of the first decision feedback equalizer.

As the first decision feedback equalizer, the Nth decision feedback equalizer also consists of a feedforward filter $115_N$, a feedback filter $120_N$, a summation circuit $125_N$, a signal generator $130_N$, a delay device $135_N$, and a coefficient-updating device $140_N$. The feedforward filter $115_N$ receives signal from the signal generator $130_{N-1}$ (not shown in the figure). The delay device $110_N$ receives signal from the delay device $110_{N-1}$ (not shown in the figure).

The coherent signal combiner 145 combines the significant component signals of the signal from the summation circuit $125_N$ coherently. The decision circuit 150 receives signal from the coherent signal combiner 145 and makes a decision on transmitted symbol.

The controller 155 receives information from various devices and generates necessary control signals for the relevant devices.

Figure 2:
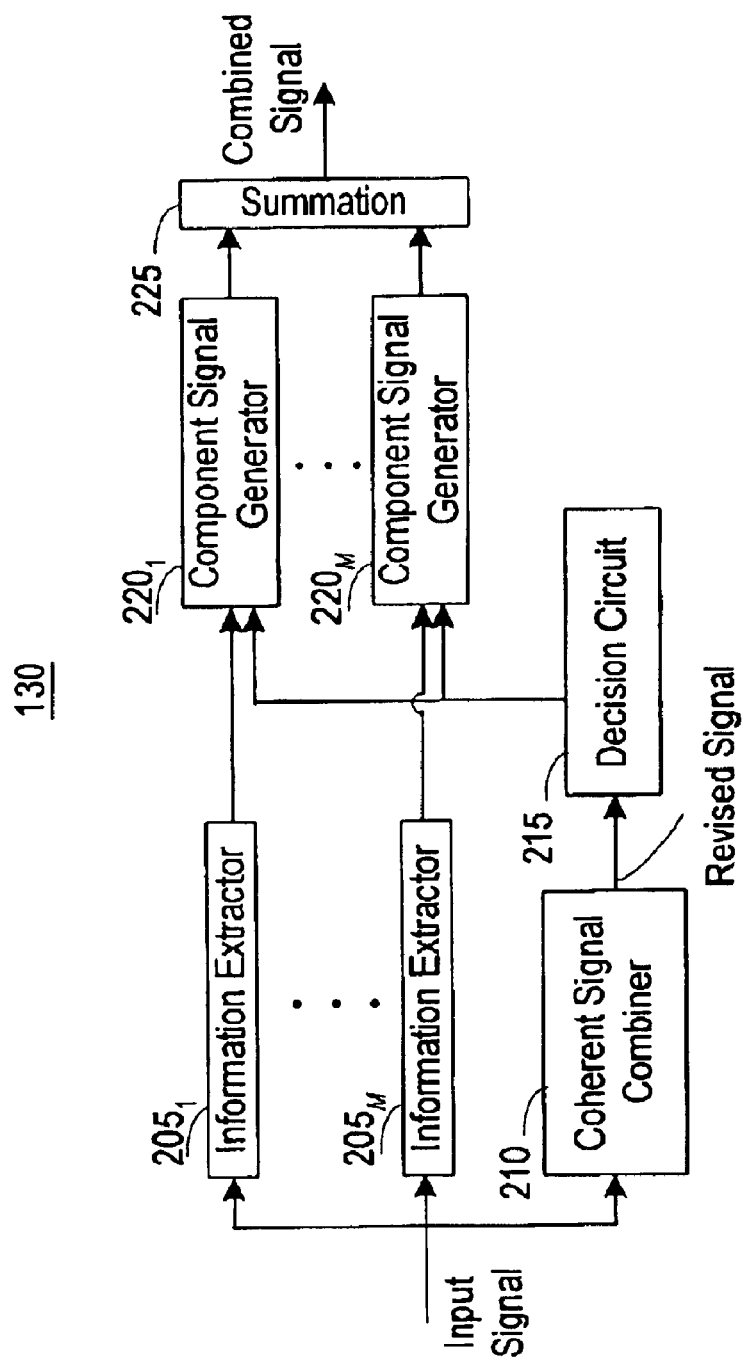
FIG. 2 illustrates the first implementation of the signal generator in FIG. 1, with an embedded coherent signal combiner.

FIG. 2 shows the first implementation of the signal generator 130 in FIG. 1. The signal generator has an embedded coherent signal combiner.

Assume there are at most M significant multipath component signals. Correspondingly, there are M identical component information extractors $205_1$ to $205_M$ each for exacting information about one of these component signals respectively. The information could include the average signal strength, the relatively delay, and the phase of that component signal.

The coherent signal combiner 210 combines all these M significant component signals together to produce a revised signal. The decision circuit 215, receiving the revised signal from the coherent signal combiner 210, makes tentative decisions on transmitted symbols. Receiving information from the decision circuit 215 and from a corresponding component information extractor, each of the M identical component signal generators $220_1$ to $220_M$ produces a corresponding significant component signal. The summation circuit 225 adds the signals from all these M component signal generators 220₁ to 220$_M$ together to produce a combined signal.

Figure 3:
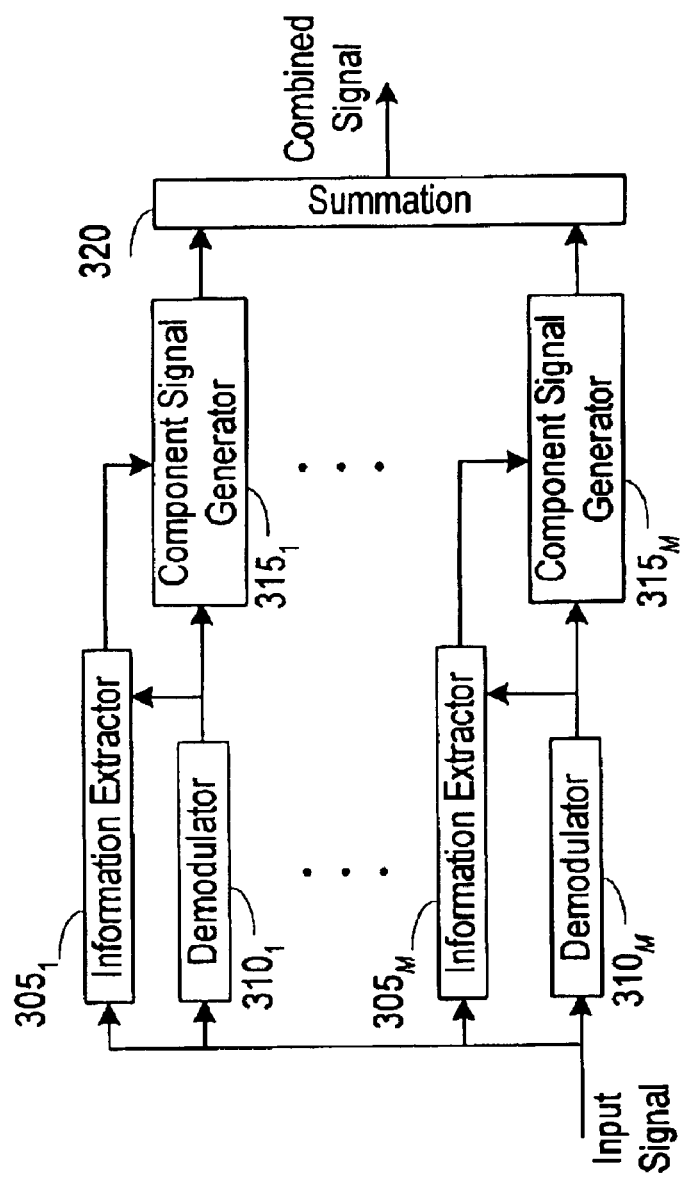
FIG. 3 illustrates the second implementation of the signal generator in FIG. 1.

FIG. 3 shows the second implementation of the signal generator 130 in FIG. 1.

Again suppose there are at most M significant multipath component signals. Correspondingly, there are M identical component information extractors 305₁ to 305$_M$ each for exacting information about one of these component signals respectively. The information could include the average signal strength, the relatively delay, and the phase of that component signal.

Each of the M identical demodulators 310₁ to 310$_M$ is for demodulating a corresponding significant component signal. Receiving information from a corresponding demodulator and a corresponding component information extractor, each of the M identical component signal generators 315₁ to 315$_M$ produces a corresponding component signal. The summation circuit 320 adds the signals from all these M component signal generators 315₁ to 315$_M$ together to produce a combined signal.

Figure 4:
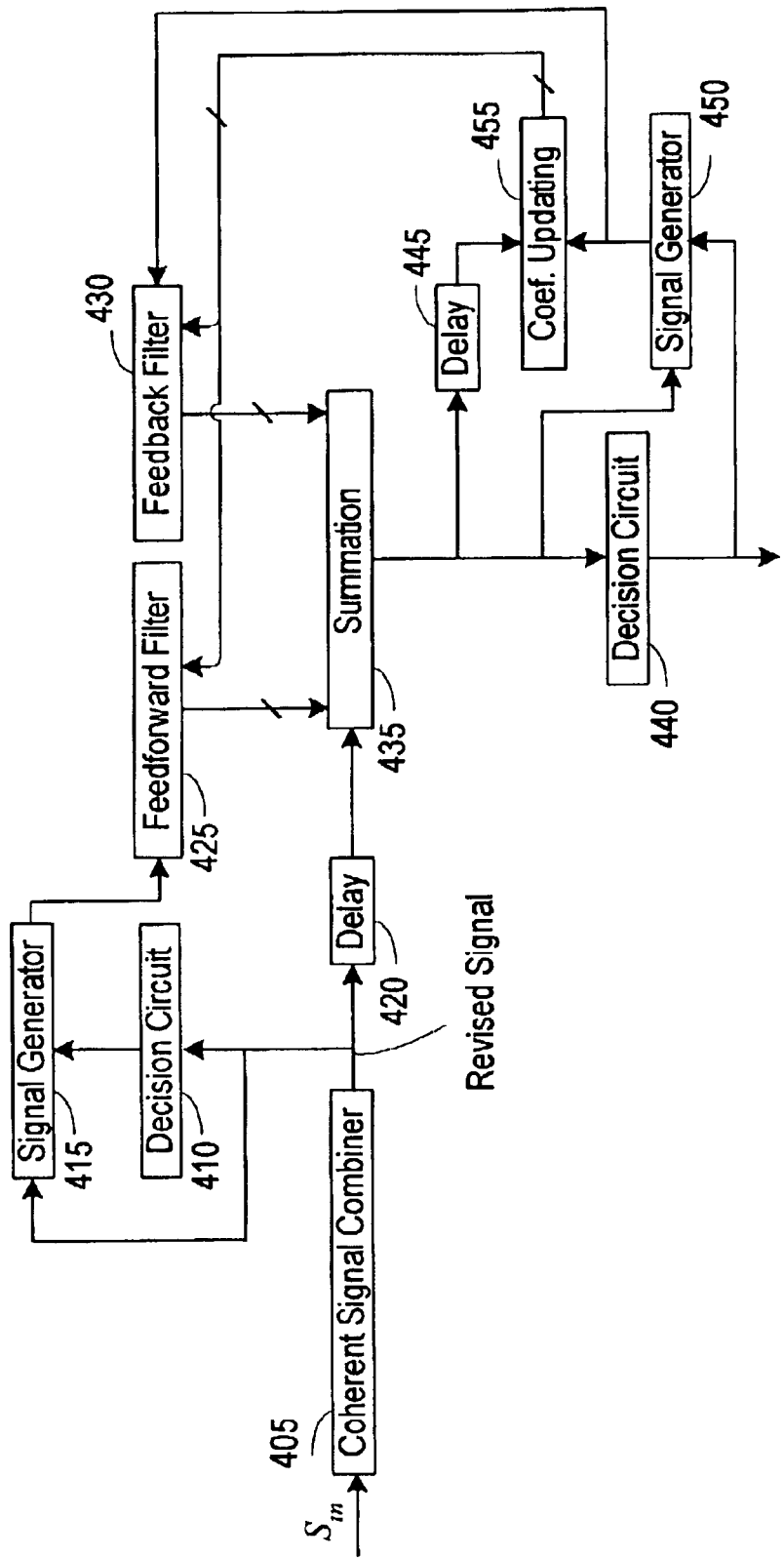
FIG. 4 illustrates the second embodiment of a decision feedback equalizer associated with a coherent signal combiner.

FIG. 4 shows another embodiment of a decision feedback equalizer associated with a coherent signal combiner.

The coherent signal combiner 405 is to combine the significant component signals of the received signal $S_{in}$ together to produce a revised signal. Receiving the revised signal, the decision circuit 410 makes tentative decisions on transmitted symbols. The signal generator 415, receiving signals from both the coherent signal combiner 410 and the decision circuit 415, produces a signal similar to a signal at transmitter. The signal is constructed from the tentative decisions on transmitted symbols and the information about the revised signal. It has only one component signal with its signal strength equal or proportional to the signal strength of the revised signal. Signal strength, such as power and magnitude, is a measurement of how strong or how weak a signal is.

The delay device 420 delays the revised signal from the coherent signal combiner 405 by a certain amount of time so that its output signal can align up with the signals from feedforward filter 425.

The feedforward filter 425, receiving the signal from the signal generator 415, is for estimating the precursor interference of future samples to the sample under consideration. The feedback filter 430 is for estimating the postcursor interference of past samples to the sample under consideration. For simplicity, the sample under consideration is referred as current sample. The summation circuit 435 adds the signals from the delay device 420, the feedforward filter 425, and the feedback filter 430 together to remove the interference due to both future and past samples to the current sample. The decision circuits 440, receiving signal from the summation circuit 435, makes decisions on transmitted symbols.

The signal generator 450 produces a rebuilt signal corresponding to the decisions made on transmitted symbols from the decision circuit 440. The rebuilt signal is similar to a signal at transmitter. The signal is constructed from the decisions of the decision circuits 440 on transmitted symbols and the information about signal from the summation circuit 435. It has only one component signal with its signal strength equal or proportional to the signal strength of signal from the summation circuit 435. The delay device 445 delays the signal from the summation circuit 435 for a certain amount of time so that its output signal can align up with the rebuilt signal from the signal generator 450. The coefficient updating device 455, taking signals from the delay device 445 and the signal generator 450, produces adjusting signals to update the coefficients of both feedforward filter 425 and feedback filter 430.

Since the current sample is the one under consideration, the coefficient of the feedforward filter 425 corresponding to estimating the interference from current sample of the signal from the signal generator 415 to current sample of the signal from the delay device 420 should be zero or very small.

What is claimed is:

1. A decision feedback equalizer for combining the significant component signals of a multipath-fading signal together and eliminating all the other component signals, comprising:

a first filter, which is coupled to receive a first combined signal, for eliminating the interference of future samples to the sample under consideration;

a second filter, which is coupled to receive a second combined signal, for eliminating the interference of past samples to the sample under consideration;

a first delay device for producing a delayed signal by delaying its input signal for a certain amount of time so that said delayed signal can align up with the signals from said first filter;

a summation circuit for combining the signals from said first delay device, said first filter, and said second filter to produce a modified signal;

a signal generator, which is coupled to receive signal from said summation circuit, for exacting information about each significant component signal of said modified signal and producing said second combined signal;

a second delay device, for delaying said modified signal from said summation circuit for a certain amount of time so that its output signal can align up with the said second combined signal from said signal generator; and a coefficient updating device, which is coupled to receive signals from said second delay device and said signal generator, for producing adjusting signals to update the coefficients in said first filter and said second filter.

2. A decision feedback equalizer for combining the significant component signals of a multipath fading signal together and eliminating all the other component signals as in claim 1, wherein said first combined signal is generated by a signal generator.

3. A decision feedback equalizer for combining the significant component signals of a multipath-fading signal together and eliminating all the other component signals as in claim 1, wherein a signal generator comprises:

a plurality of information extractors, each for exacting the information about a significant component signal from its input signal respectively;

a coherent signal combiner for combining the significant component signals of its input signal coherently to produce a revised signal;

a decision circuit, which is coupled to receive said revised signal from said coherent signal combiner, for making tentative decisions on transmitted symbols;

a plurality of component signal generators, each of which is coupled to said decision circuit and a corresponding information extractor, each for rebuilding a corresponding significant component signal; and a summation circuit, which is coupled to receive rebuilt signals from said a plurality of component signal generators, for adding these rebuilt significant component signals together to produce a combined signal.

4. A decision feedback equalizer for combining the significant component signals of a multipath-fading signal together and eliminating all the other component signals as in claim 1, wherein a signal generator comprises:
  a plurality of information extractors, each for exacting the information about a significant component signal from its input signal respectively;
  a plurality of demodulators, each for demodulating a significant component signal of its input signal respectively;
  a plurality of component signal generators, each of which is coupled to a corresponding demodulator and a corresponding information extractor, each for rebuilding a corresponding significant component signal; and
  a summation circuit, which is coupled to receive rebuilt signals from said a plurality of component signal generators, for adding these rebuilt significant component signals together to produce a combined signal.

5. A subsystem for combining all the significant component signals of a multipath-fading signal together and eliminating all the other component signals, comprising:
  a plurality of first delay devices, one of which is coupled to the received signal and each of the rest of which is coupled to its previous delay device, each for producing a delayed signal by delaying its input signal for a certain amount of time;
  a signal generator, coupled to the received signal, for exacting information about each of the significant component signals, rebuilding these significant component signals, and adding these signals together to produce a combined signal;
  a plurality of decision feedback equalizers, one of which is coupled to receive signal from said signal generator and each of rest of which is coupled to receive signal from its previous decision feedback equalizer, each for eliminating the interference of future samples and past samples to the sample under consideration and producing a combined signal;
  a coherent signal combiner, which is coupled to receive signal from of the summation circuit of the last decision feedback equalizer, for combining the significant component signals of its input signal together;
  a decision circuit, which is coupled to receive signal from said coherent signal combiner, for making a decision on transmitted symbol; and
  a controller for extracting information from various devices and producing necessary control signals for the relevant devices.

6. A subsystem for combining all the significant component signals of a multipath fading signal together and eliminating all the other component signals in claim 5, wherein a plurality of decision feedback equalizers, each of which comprises:
  a first filter, receiving a combined signal from a signal generator, for eliminating the interference of future samples to the sample under consideration;
  a second filter, receiving a combined signal from another signal generator, for eliminating the interference of past samples to the sample under consideration;
  a summation circuit for combining the signals from a corresponding first delay device, said first filter, and said second filter to produce a modified signal;
  a signal generator for exacting information from said modified signal and producing a combined signal;
  a second delay device, which is coupled to receive the modified signal from said summation circuit, for delaying its input signal for a certain amount of time; and
  a coefficient-updating device, which is coupled to receive signals from said second delay device and said signal generator, for producing adjusting signals to update the coefficients in both said first filter and said second filter.

7. A subsystem for combining all the significant component signals of a multipath fading signal together and eliminating all the other component signals as in claim 6, wherein a signal generator comprises:
  a plurality of information extractors, each for exacting the information about a corresponding significant component signal from its input signal;
  a coherent signal combiner for combining all the significant component signals together coherently to produce a revised signal;
  a decision circuit, which is coupled to receive said revised signal from said coherent signal combiner, for making tentative decisions on transmitted symbols;
  a plurality of component signal generators, each of which is coupled to said decision circuit and a corresponding information extractor, each for rebuilding a corresponding significant component signal; and
  a summation circuit, which is coupled to receive rebuilt signals from said a plurality of component signal generators, for adding these rebuilt significant component signals together to produce a combined signal.

8. A subsystem for combining all the significant component signals of a multipath fading signal together and eliminating all the other component signals as in claim 6, wherein a signal generator comprises:
  a plurality of information extractors, each for exacting the information about a significant component signal from its input signal;
  a plurality of demodulators, each for demodulating a corresponding significant component signal;
  a plurality of component signal generators, each of which is coupled to a corresponding demodulator and a corresponding information extractor, for rebuilding a corresponding significant component signal; and
  a summation circuit, which is coupled to receive rebuilt signals from said a plurality of component signal generators, for adding these rebuilt significant component signals together to produce a combined signal.

9. A subsystem for combining the significant component signals of a multipath fading signal together and eliminating all the other component signals of the multipath fading signal, comprising:
  a coherent signal combiner for combining the significant component signals of the multipath fading signal together to produce a revised signal;
  a first decision circuit, which is coupled to receive signal from said coherent signal combiner, for making tentative decisions on transmitted symbols;
  a first signal generator, which is coupled to receive signals from said coherent signal combiner and said first decision circuit, for producing a signal with only one component signal and with signal strength proportional to the signal strength of said revised signal;
  a first filter, which is coupled to receive signal from said first signal generator, for estimating the precursor interference of future samples to the sample under consideration;
  a first delay device, which is coupled to receive signal from said coherent signal combiner, for delaying its input signal by a certain amount of time so that its output signal can align up with the signals from said first filter;

a second filter, which is coupled to a second signal generator, for estimating the postcursor interference of past samples to the sample under consideration;

a summation circuit, which is coupled to receive signals from said first delay device, said first filter, and said second filer, for adding these signals together;

a second decision circuit, which is coupled to receive signal from said summation circuit, for making decisions on transmitted symbols;

a second signal generator, which is coupled to receive signal from said second decision circuit and said summation circuit, for producing a signal with only one component signal and with signal strength proportional to the signal strength of the signal from said summation circuit for said second filter; and a coefficient updating device, for producing adjusting signals to update the coefficients of both said first filter and said second filter.

10. A subsystem for combining the significant component signals of a multipath fading signal together and eliminating all the other component signals of the multipath fading signal as in claim 9, further comprising:

a second delay device, which is coupled to receive signal from said summation circuit, for delaying its input signal by a certain amount of time so that its output signal can align up with the signal from said second signal generator, whereby said coefficient updating device is coupled to receive signals from said second delay device and said second signal generator to producing adjusting signals.

* * * * *